Aug. 30, 1927. 1,640,852

C. RAISIG

FLEXIBLE COUPLING

Filed May 8, 1926

WITNESSES

A. B. Wallace.
William B. Jaspert.

INVENTOR

Charles Raisig
by Winter, Brown & Critchlow
his attorneys.

Patented Aug. 30, 1927.

1,640,852

UNITED STATES PATENT OFFICE.

CHARLES RAISIG, OF PITTSBURGH, PENNSYLVANIA.

FLEXIBLE COUPLING.

Application filed May 8, 1926. Serial No. 107,599.

This invention relates to flexible couplings, more especially to a coupling member for joining a pair of cooperating machine elements.

It is among the objects of this invention to provide a flexible coupling of simple, compact and durable mechanical construction which shall embody a flexible element that is disposed in the cooperating coupling members in such manner as to prevent undue stressing and straining of the several operating parts.

Another object of this invention is to provide a flexible coupling which shall be adapted to permit a relatively large amount of misalignment of the cooperating members which it is adapted to join and which shall be adapted to function as a smooth running coupling or connecting member between the members to which it is connected at relatively high speeds of operation.

Heretofore various forms of flexible couplings have been proposed to permit efficient operation at relatively high speeds of the coupling members and to permit a certain amount of misalignment between the members joined thereby in accordance with the particular service requirements for which the coupling members were designed. Most of the prior art couplings are of a rather complicated construction to allow for freedom of motion between the cooperating parts and those that were of a more simple design were subjected to the criticism of being limited in their application to operating or service conditions in which there is little or no misalignment of the coupling members.

In accordance with the present invention it is proposed to provide a coupling member especially applicable to the joining of motor generator sets or other high speed operating shaft members in which the shafts to be coupled are found to be out of alignment as a result of the manner of assembling or mounting the apparatus of which they are a part. It is proposed to utilize a pair of coaxially aligned complementary coupling members having cooperating offset portions provided with slotted openings adapted to receive a flexible element of substantially V-shape or one having a pair of converging arms which are engaged by the slotted openings of the offset portions substantially along their entire length.

It is found that a coupling of this construction permits an unusually large degree of misalignment both angularly and when the shafts to which they are coupled are disposed with their axes in parallel alignment, but not coaxially aligned.

Figure 1:
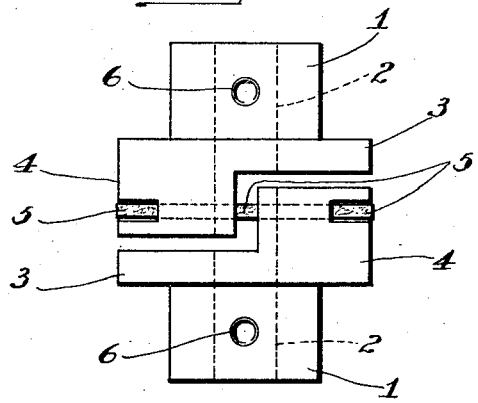
Figure 2:
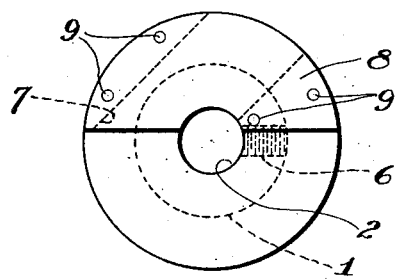
Figure 3:
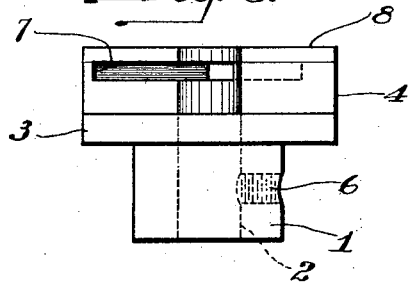

In the accompanying drawings constituting a part hereof, and in which like reference characters designate like parts, Fig. 1 is a view in elevation of a flexible coupling member embodying the principles of this invention; Fig. 2 is a view in end elevation of one of the complementary coupling members; Fig. 3 is a side elevational view thereof; and Figs. 4 and 5 are, respectively, elevational views of the flexible element utilized in cooperation with the coupling parts.

As shown in Figs. 2 and 3, the complementary coupling elements comprise hub members 1 having openings 2 provided centrally therein and having flanged portions 3 provided with offset portions 4, which are adapted to co-operate when two of such coupling members are joined by a flexible element 5, as shown in Fig. 1. The hub portions 1 are provided with threaded openings 6 adapted to receive set-screws, or they may be provided with key seats or other locking means by which they may be secured to the shafts on which they are mounted.

The off-set portions 4 are provided with slotted openings 7 disposed angularly as shown in Fig. 2, the slotted openings being formed by slotting the offset portion 4 and mounting a cover plate 8 thereon as by dowel pins 9 or in any other suitable manner, or the offset portion may be extended to include the cover member 8, and the slots 7 may be either cored, broached or otherwise formed therein.

Figure 4:
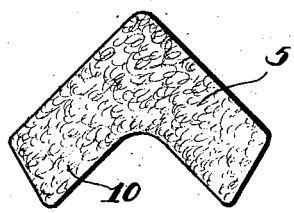
Figure 5:
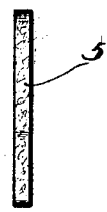

Referring to Figs. 4 and 5, the flexible element 5 is an angular member of substantially V-shape having converging arms 10 of substantially the same dimensions as the slotted openings 7 in which they are disposed as shown in Fig. 1. The flexible element is formed preferably of leather, but may be of any other suitable flexible material or composition.

In assembling the coupling members the flexible element is inserted with one of its arms in the slotted opening of one of the coupling parts, and the other coupling is assembled thereto by disposing its offset portion in a position opposite that of the complementary member and sliding it on to the flexible element which is of such angular shape that the coupling parts will be in substantially axial alignment, allowing of course for such misalignment as may exist between the shaft members to which they are secured.

In operation the flexible elements are free to slide in the slotted openings of the coupling members, or the latter may slide on the flexible element to allow for any coaxial misalignment of the coupled shaft elements, and the flexible element will be subjected to a slight degree of flexure in the direction of its greatest flexibility to allow for any angular misalignment or disposition of the shaft elements.

The inherent nature of this type of coupling relieves the flexible element of undue strain and stresses so that a relatively thin leather member having a substantial section provided by its width is found to be capable of transmitting a substantial amount of torque at relatively high speeds of operation without detrimentally effecting the coupling and without subjecting the coupled members to detrimental shocks or impacts which would result from the utilization of coupling members having a lesser degree of flexibility or freedom of movement.

It is evident from the foregoing description of this invention that flexible coupling members made in accordance therewith provide a simple and efficient means for coupling the shafts of relatively movable machine elements and that the design and construction of the coupling members are such as to permit ready assembly of the parts and accessibility for renewal and inspection.

Although a specific embodiment of the invention has been herein set forth, it will be obvious to those skilled in the art that various modifications may be made in the details of construction and in the design and arrangement of the several cooperating parts without departing from the principles herein set forth.

I claim:

1. A flexible coupling comprising a pair of coaxially aligned complementary coupling members provided with cooperating offset portions having slotted openings therein, and a substantially V-shaped flexible element disposed in said openings and adapted to cooperate therewith.

2. A flexible coupling comprising a pair of coaxially aligned complementary coupling members provided with cooperating offset portions having slotted openings therein, and an angular substantially V-shaped flexible element disposed in said openings and adapted to cooperate therewith, the slot of one coupling member being in alignment with but disposed oppositely to the slot of the other coupling member.

3. A flexible coupling comprising a pair of coaxially aligned complementary coupling members provided with cooperating offset portions having slotted openings therein, and a flexible element having a pair of converging arms adapted for engagement with slotted openings of said offset portions.

4. A flexible coupling comprising a pair of coaxially aligned complementary coupling members provided with cooperating offset portions having slotted openings therein, and a flexible element having a pair of converging arms adapted for engagement with the slotted openings of said offset portions, said converging arms being in engagement along substantially their entire lengths.

In testimony whereof, I sign my name.

CHARLES RAISIG.